United States Patent
Ishikawa et al.

(10) Patent No.: US 9,726,420 B2
(45) Date of Patent: Aug. 8, 2017

(54) APPARATUS FOR DEFROSTING A PLURALITY OF HEAT EXCHANGERS HAVING A COMMON OUTDOOR FAN

(75) Inventors: Tomotaka Ishikawa, Tokyo (JP); So Nomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 301 days.

(21) Appl. No.: 14/118,572

(22) PCT Filed: Jun. 8, 2011

(86) PCT No.: PCT/JP2011/003225
§ 371 (c)(1),
(2), (4) Date: Nov. 19, 2013

(87) PCT Pub. No.: WO2012/168971
PCT Pub. Date: Dec. 13, 2012

(65) Prior Publication Data
US 2014/0090406 A1    Apr. 3, 2014

(51) Int. Cl.
*F25B 47/02* (2006.01)
*F25D 21/00* (2006.01)
(Continued)

(52) U.S. Cl.
CPC ........ *F25D 21/004* (2013.01); *F24F 11/0086* (2013.01); *F25B 47/02* (2013.01);
(Continued)

(58) Field of Classification Search
CPC ........ F25B 47/02; F25B 47/025; F25B 13/00; F25B 49/02–49/27; F24F 11/02; F24F 11/0012; F24F 11/0079; F24F 11/008
See application file for complete search history.

(56) References Cited

U.S. PATENT DOCUMENTS 3,103,794 A * 9/1963 Kyle et al. ............... 62/160
3,992,895 A * 11/1976 Kramer ..................... 62/155
(Continued)

FOREIGN PATENT DOCUMENTS

CN   101975440 A   2/2011
EP    0027604 A2   4/1981
(Continued)

OTHER PUBLICATIONS

Machine Translation JP10-009725.*
(Continued)

*Primary Examiner* — Orlando E Aviles Bosques
*Assistant Examiner* — Antonio R Febles
(74) *Attorney, Agent, or Firm* — Posz Law Group, PLC (57) ABSTRACT

A refrigerating and air-conditioning apparatus includes multiple refrigeration cycles each including a compressor, a four-way valve, an indoor heat exchanger, a pressure reducing device, and an outdoor heat exchanger which are connected by a pipe, each refrigeration cycle being configured to be capable of performing a cooling operation and a heating operation, an outdoor fan configured to send air for heat exchange with the outdoor heat exchangers of the refrigeration cycles, multiple indoor fans arranged corresponding to the respective indoor heat exchangers of the refrigeration cycles, and a controller configured to defrost the outdoor heat exchanger of the at least one refrigeration cycle, control a rotation speed of the indoor fan corresponding to the refrigeration cycle performing the defrosting operation such that a temperature of air mixed by air-sending through the indoor fans reaches a predetermined temperature.

19 Claims, 3 Drawing Sheets

(51) Int. Cl.
 *F25B 13/00* (2006.01)
 *F24F 11/00* (2006.01)
(52) U.S. Cl.
 CPC ... *F24F 11/0079* (2013.01); *F24F 2011/0089* (2013.01); *F25B 13/00* (2013.01); *F25B 2313/0251* (2013.01); *F25B 2400/06* (2013.01); *Y02B 30/746* (2013.01)

(56) References Cited

U.S. PATENT DOCUMENTS

| | | | |
|---|---|---|---|
| 4,332,137 A * | 6/1982 | Hayes, Jr. | 62/81 |
| 6,021,644 A * | 2/2000 | Ares et al. | 62/151 |
| 2005/0044861 A1 | 3/2005 | Cho | |
| 2005/0086969 A1 * | 4/2005 | Lifson et al. | 62/324.1 |
| 2005/0150238 A1 * | 7/2005 | Helt | 62/176.6 |
| 2005/0229622 A1 * | 10/2005 | Franck et al. | 62/352 |
| 2008/0307803 A1 * | 12/2008 | Herzon | 62/93 |

FOREIGN PATENT DOCUMENTS

| | | | |
|---|---|---|---|
| GB | 2209823 A | 5/1989 |
| JP | 56-94164 A | 7/1981 |
| JP | 02-208436 A | 8/1990 |
| JP | 04-340044 A | 11/1992 |
| JP | 07-055296 A | 3/1995 |
| JP | 10-009725 A | 1/1998 |
| JP | 11-173712 A | 7/1999 |
| JP | 2002-286273 A | 10/2002 |
| JP | 2003-106712 A | 4/2003 |
| JP | 2004-176967 A | 6/2004 |
| JP | 2006-116981 A | 5/2006 |
| JP | 2009-210174 A | 9/2009 |

OTHER PUBLICATIONS

Machine Translation JP07-005296.*
Office Action mailed Aug. 12, 2014 issued in corresponding JP patent application No. 2013-519229 (and English translation).
Extended European Search Report issued Feb. 23, 2015 in the corresponding EP patent application No. 11867130.4.
International Search Report of the International Searching Authority mailed Sep. 6, 2011 for the corresponding international application No. PCT/JP2011/003225 (and English translation).
Supplementary European Search Report issued Nov. 3, 2015 in the corresponding EP application No. 11867130.4.
Office Action mailed Aug. 20, 2015 in the corresponding CN application No. 201180071460.8 (English translation attached).
Office Action dated Apr. 5, 2016 issued in corresponding CN patent application No. 201180071460.8 (and English translation).
Office Action dated Aug. 24, 2016 issued in corresponding CN patent application No. 201180071460.8 (and English translation).
Extended European Search Report dated Aug. 10, 2016 issued in corresponding EP patent application No. 16168634.0.

* cited by examiner

<ALTERNATING DEFROSTING>

| OUTDOOR FAN | FIRST REFRIGERATION CYCLE | | SECOND REFRIGERATION CYCLE | |
|---|---|---|---|---|
| | OPERATION MODE | INDOOR FAN | OPERATION MODE | INDOOR FAN |
| OFF | DEFROSTING | OFF | HEATING | ON |

APPARATUS FOR DEFROSTING A PLURALITY OF HEAT EXCHANGERS HAVING A COMMON OUTDOOR FAN

CROSS REFERENCE TO RELATED APPLICATION

This application is a U.S. national stage application of International Application No. PCT/JP2011/003225 filed on Jun. 8, 2011.

TECHNICAL FIELD

The present invention relates to refrigerating and air-conditioning apparatuses including multiple refrigeration cycles each utilizing a vapor compression refrigeration cycle, and in particular, relates to a refrigerating and air-conditioning apparatus capable of performing a defrosting operation simultaneously with a heating operation under air conditions where, for example, frost is deposited, while continuing the heating operation.

BACKGROUND ART

A vehicle air-conditioning apparatus has been recently developed that includes a plurality of refrigeration cycles and is capable of performing a defrosting operation simultaneously with a heating operation while continuing the heating operation on an indoor side, serving as an air-conditioning target space (refer to Patent Literature 1, for example). In such a vehicle air-conditioning apparatus, for example, in order to enable one of the refrigeration cycles to perform the defrosting operation while the heating operation is being continued, the refrigeration cycle performing defrosting based on a cooling operation using an outdoor heat exchanger as a condenser and the other refrigeration cycle continuing the heating operation are arranged in a vehicle. An indoor fan is disposed in substantially the middle of the width of the vehicle. An indoor heat exchanger functioning as an evaporator is disposed on one side of the indoor fan and another indoor heat exchanger functioning as a condenser is disposed on the other side thereof. The defrosting operation is performed in one of the refrigeration cycles and the heating operation is performed in the other refrigeration cycle such that the operations are performed simultaneously.

CITATION LIST

Patent Literature

Patent Literature 1: Japanese Unexamined Patent Application Publication No. 2006-116981

SUMMARY OF INVENTION

Technical Problem

In the above-described conventional art, the refrigeration cycle performing the heating operation includes the indoor heat exchanger functioning as a condenser and the other refrigeration cycle performing the defrosting operation includes the indoor heat exchanger functioning as an evaporator. Air having passed through the indoor heat exchanger and air having passed through the other indoor heat exchanger are sucked into the shared indoor fan and are then mixed in a casing of the indoor fan, thus obtaining air-conditioned air (hereinafter, referred to as "conditioned air"), which is blown out of the fan.

Accordingly, a temperature of the blown air is reduced below that in normal heating operation. This may provide a sense of discomfort to, for example, passengers. Additionally, since defrosting is performed while an outdoor fan is being operated in order to continue heating, a condensing temperature in the outdoor heat exchanger of the refrigeration cycle performing the defrosting operation may not rise, for example, if outside air is at a low temperature. Unfortunately, efficient defrosting may fail to be achieved.

The present invention provides a refrigerating and air-conditioning apparatus capable of performing an operation for defrosting an outdoor heat exchanger in a heating operation under such air conditions that the outdoor heat exchanger is frosted, while continuing the heating operation.

Solution to Problem

The present invention provides a refrigerating and air-conditioning apparatus including multiple refrigeration cycles each including a compressor, a four-way valve, an indoor heat exchanger, a pressure reducing device, and an outdoor heat exchanger which are connected by a pipe, each refrigeration cycle being configured to be capable of performing a cooling operation and a heating operation, an outdoor fan configured to send air for heat exchange with the outdoor heat exchangers of the refrigeration cycles, multiple indoor fans arranged corresponding to the respective indoor heat exchangers of the refrigeration cycles, each indoor fan being configured to create air flow to be sent through the respective indoor heat exchanger to an air-conditioning target space, and a controller configured to, when at least one of the refrigeration cycles starts a defrosting operation to defrost the outdoor heat exchanger of the at least one of the refrigeration cycles, control a rotation speed of the indoor fan corresponding to the refrigeration cycle performing the defrosting operation such that a temperature of air mixed by air-sending through the indoor fans reaches a first predetermined temperature.

Advantageous Effects of Invention

According to the refrigerating and air-conditioning apparatus of this invention, the controller controls the rotation speed of the indoor fan corresponding to the refrigeration cycle performing the defrosting operation depending on a temperature of air obtained by mixing the air flows blown from the indoor fans. Advantageously, air sent to an indoor space can be maintained at an intended temperature while the defrosting operation is being performed.

DESCRIPTION OF EMBODIMENTS

Refrigerating and air-conditioning apparatuses according to Embodiments of the invention will be described below with reference to the drawings.

As regards levels of temperatures, pressures, or the like to be described herein, the levels are not determined in relation to particular absolute values but are indicated on the basis of their relation determined relatively in, for example, a state or operation of an apparatus or the like. Furthermore, in the following description, for example, components of the same kind are distinguished from one another using subscripts. If the components of the same kind do not have to be distinguished from one another or specified, the subscripts may be omitted.

Embodiment 1

Figure 1:
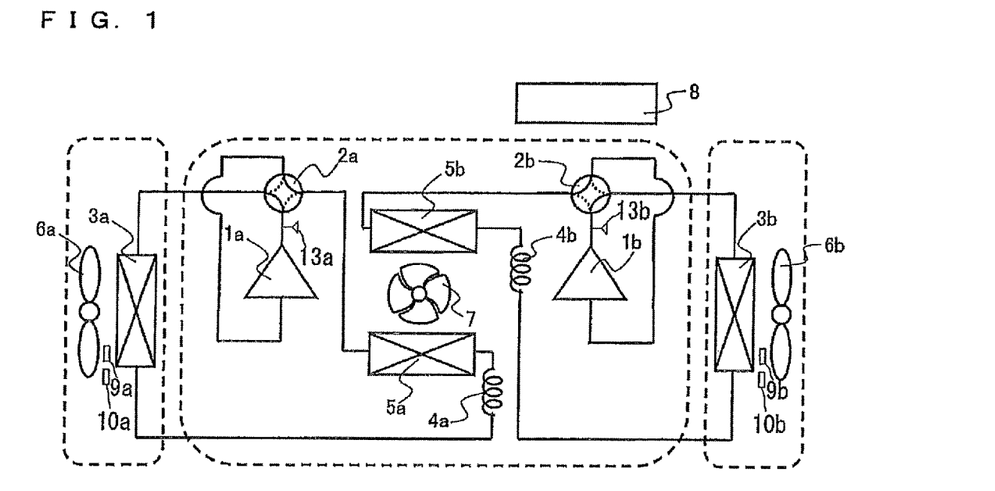
FIG. 1 is a diagram illustrating a configuration of a refrigerating and air-conditioning apparatus according to Embodiment 1 of the invention.

FIG. 1 is a diagram illustrating a configuration of a refrigerating and air-conditioning apparatus according to Embodiment 1 of the invention. The refrigerating and air-conditioning apparatus according to Embodiment 1 includes a plurality of refrigeration cycles. Referring to FIG. 1, a compressor 1a, a four-way valve 2a, an indoor heat exchanger 3a, a pressure reducing device 4a, and an outdoor heat exchanger 5a are connected such that a refrigerant can be circulated therethrough, thus constituting a first refrigeration cycle (refrigerant circuit). The refrigerating and air-conditioning apparatus further includes an indoor fan 6a configured to create air flow from the indoor heat exchanger 3a to an indoor space, serving as an air-conditioning target space, by sending air and promote heat exchange between the air and the refrigerant in order to condition the air in the indoor space. Furthermore, a compressor 1b, a four-way valve 2b, an indoor heat exchanger 3b, a pressure reducing device 4b, and an outdoor heat exchanger 5b are connected such that the refrigerant can be circulated therethrough, thus constituting a second refrigeration cycle. The refrigerating and air-conditioning apparatus further includes an indoor fan 6b configured to create air flow from the indoor heat exchanger 3b to the indoor space by sending air and promote heat exchange between the air and the refrigerant to condition the air in the indoor space.

In each refrigeration cycle, the compressor 1 is configured to suck the refrigerant, compress the sucked refrigerant, and discharge the resultant refrigerant. The compressor 1 is provided with an inverter unit or the like, and varies a driving frequency to any value such that the capacity of the compressor 1 (or the rate of refrigerant per unit time) can be varied finely. The four-way valve 2 is configured to switch between a direction of flow of the refrigerant in a cooling operation (including a defrosting operation) and a direction of flow of the refrigerant in a heating operation in accordance with an instruction from, for example, a controller 8. The indoor heat exchanger 3 is configured to exchange heat between the refrigerant and air (indoor air). For example, the indoor heat exchanger 3 functions as a condenser in the heating operation such that the refrigerant condenses and liquefies. In addition, the indoor heat exchanger 3 functions as an evaporator in the cooling operation such that the refrigerant evaporates and gasifies.

The pressure reducing device 4 is a device configured to reduce the pressure of the refrigerant such that the refrigerant is expanded, and may include a capillary tube. Furthermore, the pressure reducing device 4 may include an expansion device, such as a flow control valve or an expansion valve, capable of changing its opening degree. The outdoor heat exchanger 5 is configured to exchange heat between the refrigerant and air (outdoor air, or outside air). For example, the outdoor heat exchanger 5 functions as an evaporator in the heating operation such that the refrigerant evaporates and gasifies. In addition, the outdoor heat exchanger 5 functions as a condenser in the cooling operation such that the refrigerant condenses and liquefies.

Figure 2:
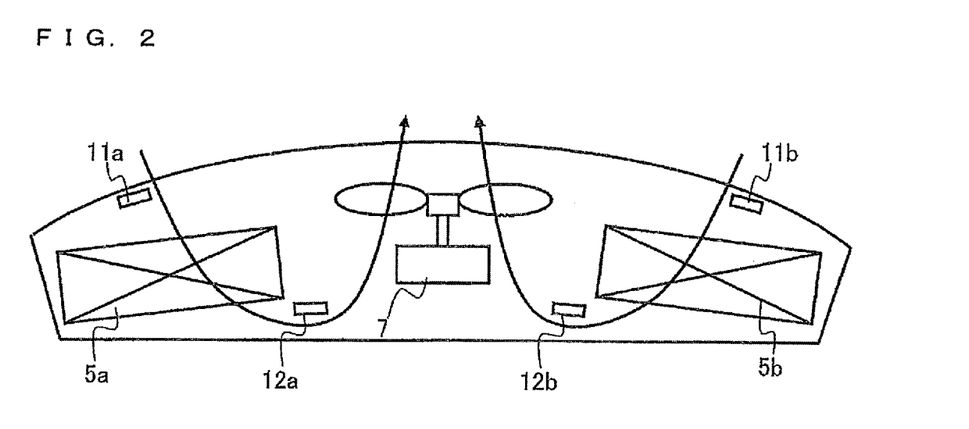
FIG. 2 is a schematic diagram explaining an outdoor side unit in Embodiment 1 of the invention.

FIG. 2 is a schematic diagram explaining an outdoor side unit in Embodiment 1. An outdoor fan 7 is a fan shared by the outdoor heat exchanger 5a and the outdoor heat exchanger 5b and is configured to promote heat exchange between the outside air and the refrigerant by sending air.

The first refrigeration cycle and the second refrigeration cycle can independently perform the cooling operation and the heating operation. The first refrigeration cycle and the second refrigeration cycle are operated depending on an air conditioning load. Furthermore, the outdoor heat exchanger 5a of the first refrigeration cycle and the outdoor heat exchanger 5b of the second refrigeration cycle are arranged on one side where flow of the outside air is created by driving the outdoor fan 7.

The controller 8 is configured to control the components constituting the refrigerating and air-conditioning apparatus, for example, switch between operation modes, such as the cooling operation and the heating operation, (the four-way valves 2a and 2b) and driving the indoor fans 6a and 6b, the outdoor fan 7, and the compressors 1a and 1b.

A temperature sensor 9 (temperature sensor 9a, 9b) and a humidity sensor 10 (humidity sensor 10a, 10b) are arranged, for example, near an air inlet side of the indoor heat exchanger 3 or in the indoor space, and detect a temperature and a humidity in the indoor space, respectively. The temperature detected by the temperature sensor 9 and the humidity detected by the humidity sensor 10 are used for processing, such as estimation of an air conditioning capacity necessary for air to be conditioned in the cooling operation or the heating operation, the process being performed by the controller 8.

Furthermore, a temperature sensor 11 (temperature sensor 11a, 11b) is disposed on, for example, an air inlet side of the outdoor fan 7 and is configured to detect a temperature of the outside air (outdoor temperature). In addition, a temperature sensor 12 (temperature sensor 12a, 12b) is disposed on an air outlet side of the corresponding outdoor heat exchanger 5. A pressure sensor 13 (pressure sensor 13a, 13b) is disposed to detect, for example, a saturation temperature of the refrigerant in the outdoor heat exchanger 5 in Embodiment 1. These sensors (detecting means) are used for a process of determining whether to perform the defrosting operation in the heating operation at a low outside air temperature, the process being performed by the controller 8.

For example, if a heat exchanger is frosted, fins constituting the heat exchanger are clogged, so that the amount of air flow passing through the heat exchanger is reduced and a heat transfer resistance caused by a layer of frost is increased, leading to a reduced evaporating temperature. Consequently, the difference between the temperature of air flowing into the outdoor heat exchanger 5 and the evaporating temperature is increased. As the evaporating temperature decreases, performance associated with air conditioning decreases. It is therefore necessary to periodically defrost the outdoor heat exchanger 5.

As regards determination as to whether to perform the defrosting operation, the controller 8 makes the determination on the basis of a saturation temperature of the refrigerant in the outdoor heat exchanger 5 which is performing the heating operation in Embodiment 1. Specifically, when the evaporating temperature of the refrigerant in the outdoor heat exchanger 5 is at or below 0 degrees C. and the difference between the evaporating temperature and the temperature of air flowing into the outdoor heat exchanger 5 is greater than or equal to a predetermined temperature difference (for example, 15 degrees C.), the controller 8 determines that defrosting should be done and starts the defrosting operation.

Furthermore, if the amount of frost can be previously estimated on the basis of, for example, heating operation time, the heating operation time during which, for example, the evaporating temperature in the outdoor heat exchanger 5 is at or below 0 degrees C. may be measured using a timer (not illustrated) or the like. The defrosting operation may be determined to be started after a lapse of a predetermined time. As regards determination as to whether the defrosting operation is completed, when it is determined that a temperature associated with detection by the temperature sensor 12 disposed in the downstream (or on the outlet side) of the outdoor heat exchanger 5 in an air flow direction reaches a predetermined temperature (e.g., 10 degrees C.), it may be determined that defrosting is completed. Furthermore, if a condensing capacity of the outdoor heat exchanger 5 in the refrigeration cycle performing the defrosting operation can be estimated, defrosting operation time may be measured using a timer or the like and completion of the defrosting operation may be determined.

Furthermore, if a heating load is small, the refrigeration cycle may be allowed to stop the heating operation in order to prevent excessive supply of capacity. In this case, after the heating operation is stopped, the refrigeration cycle may be allowed to perform the defrosting operation and be prepared for the next heating operation. Consequently, the refrigeration cycle does not perform the defrosting operation during, for example, the heating operation performed by the other refrigeration cycle. Comfort can be improved by the entire apparatus without a reduction in temperature of air blown into the indoor space.

An operation of the refrigerating and air-conditioning apparatus will now be described mainly about refrigerant flow in each refrigeration cycle. For example, to perform the cooling operation, each of the compressors 1a and 1b compresses the refrigerant and discharges the resultant refrigerant. The refrigerant compressed and heated by each of the compressors 1a and 1b exchanges heat with the outdoor air in the corresponding one of the outdoor heat exchangers 5a and 5b, so that the refrigerant is cooled and condensed. At this time, the outdoor fan 7 promotes the heat exchange between the outdoor air and the refrigerant. After that, the refrigerant is pressure-reduced by the corresponding one of the pressure reducing devices 4a and 4b. The resultant refrigerant exchanges heat with the indoor air in the corresponding one of the indoor heat exchangers 3a and 3b, so that the refrigerant is heated and evaporated. The refrigerant then flows into the corresponding one of the compressors 1a and 1b. Such a cycle is repeated. In this case, the air cooled by heat exchange in each of the indoor heat exchangers 3a and 3b is blown into the indoor space by the corresponding one of the indoor fans 6a and 6b.

Furthermore, to perform the heating operation, each of the compressors 1a and 1b compresses the refrigerant and discharges the resultant refrigerant. The refrigerant compressed and heated by each of the compressors 1a and 1b exchanges heat with the indoor air in the corresponding one of the indoor heat exchangers 3a and 3b, so that the refrigerant is cooled and condensed. Consequently, the air heated by heat exchange in the indoor heat exchanger is blown into the indoor space by each of the indoor fans 6a and 6b. The refrigerant cooled and condensed by each of the indoor heat exchangers 3a and 3b is pressure-reduced by the corresponding one of the pressure reducing devices 4a and 4b and exchanges heat with the outdoor air in the corresponding one of the outdoor heat exchangers 5a and 5b, so that the refrigerant is heated and evaporated. The resultant refrigerant then flows into the corresponding one of the compressors 1a and 1b. Such a cycle is repeated.

As described above, during the heating operation, the controller 8 determines on the basis of temperatures associated with detection by the temperature sensors 11 and pressures associated with detection by the pressure sensors 13a and 13b whether to start the defrosting operation. When determining to perform the defrosting operation, for example, the controller 8 operates one of or each of the four-way valves 2a and 2b to switch between the refrigerant flow directions, thus starting the defrosting operation.

To perform the defrosting operation, one of or each of the outdoor heat exchangers 5a and 5b is used as a condenser and defrosting is performed using heat transferred from the refrigerant. In this case, if low-temperature outside air flows through the outdoor heat exchangers 5a and 5b, the amount of heat for defrosting may be lost, which is inefficient. Furthermore, if the condensing temperature of the refrigerant is reduced to, for example, 0 degrees C. or lower, defrosting may fail to be achieved. Accordingly, the outdoor fan 7 is stopped in order to achieve efficient defrosting while at least one of the refrigeration cycles is performing the defrosting operation, thus reducing defrosting time. Furthermore, if the indoor heat exchanger 3b functions as an evaporator in the defrosting operation, cold air would be blown into the indoor space. Accordingly, the controller 8 stops the indoor fan 6 corresponding to the refrigeration cycle which is performing the defrosting operation, thus preventing cold air from being blown. This eliminates a reduction in air temperature caused by cold air blown into the indoor space, thereby maintaining the comfort.

Whether to terminate the defrosting operation is determined on the basis of temperatures associated with detection by the temperature sensors 12a and 12b. When it is determined to terminate the defrosting operation, one of or each of the four-way valves 2a and 2b is again controlled to switch between the refrigerant flow directions, thus returning to the heating operation.

In the defrosting operation, as described above, the outdoor heat exchanger 5 is allowed to function as a condenser and heat transferred from the refrigerant is used. Although the outdoor heat exchanger 5 is used as a condenser, the refrigerant does not necessarily have to be condensed and liquefied. It is only required that the amount of heat carried by the refrigerant be transferred to frost. Furthermore, for example, off-cycle defrosting in which if the temperature of air flowing into the outdoor heat exchanger 5 is at or above 0 degrees C., the compressor 1 is stopped and frost is melted by heat from outside air, heater defrosting using external heat from a heater or waste heat or the like, or heat storage defrosting in which heating energy during heating is stored and is used may be performed.

Figure 3:
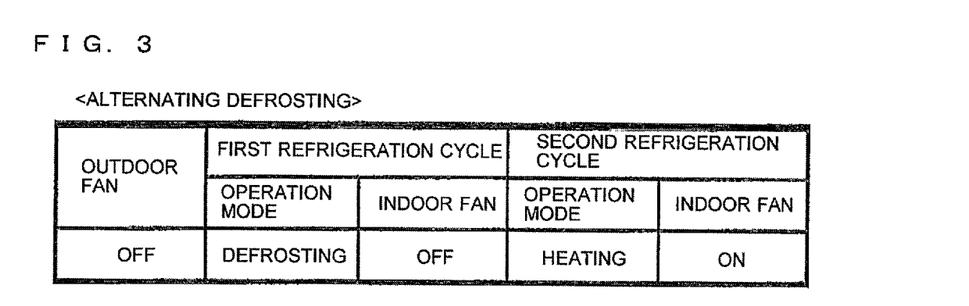
FIG. 3 is a table illustrating the relationship between operation modes, indoor fans 6, and an outdoor fan 7.

FIG. 3 is a table illustrating the relationship between operation modes, the indoor fans 6, and the outdoor fan 7. In the refrigerating and air-conditioning apparatus including a plurality of refrigeration cycles, preferably, one refrigeration cycle performs the defrosting operation and the other refrigeration cycle performs the heating operation, as illustrated in FIG. 3, such that the defrosting operation is performed at different timings in the refrigeration cycles. As regards determination as to whether to start the first defrosting operation after start of the heating operation, the controller 8 makes the determination on the basis of different conditions for the respective refrigeration cycles.

For example, in the normal heating operation, the difference between the evaporating temperature and the air temperature on the inlet side of the outdoor heat exchanger 5 is 10 degrees C. As regards the determination as to whether to start the defrosting operation in Embodiment 1, for example, when the difference between the evaporating temperature and the temperature of air flowing into the outdoor heat exchanger 5 is greater than or equal to 15 degrees C., it is determined to start the defrosting operation. In this case, the criterion on whether to start the first defrosting operation after start of the heating operation is based on determination as to whether the difference between the evaporating temperature and the temperature of air flowing into the outdoor heat exchanger 5a in the first refrigeration cycle is greater than or equal to 12 degrees C. This is the only case that such a criterion is used. On the other hand, the difference between the evaporating temperature and the temperature of air flowing into the outdoor heat exchanger 5b in the second refrigeration cycle is set to be greater than or equal to 15 degrees C. Accordingly, the first refrigeration cycle starts the defrosting operation before the second refrigeration cycle. As regards determination as to whether to start the second and subsequent defrosting operations, the temperature difference as the criterion is set to be greater than or equal to 15 degrees C. in each of the refrigeration cycles.

The timings of starting defrosting in the refrigeration cycles differ from one another in the above manner. Although the two refrigeration cycles perform the defrosting operation in an alternate manner in Embodiment 1, the same applies to a case where three or more refrigeration cycles perform the defrosting operation at different timings. Furthermore, if the characteristics of the difference between the timings of starting defrosting relative to the difference between the determinations as to whether to start the defrosting operation are grasped, the intervals between the timings of performing the defrosting operation by each refrigeration cycle can be freely set. In this case, preferably, the defrosting operation is started at regular intervals as much as possible in each refrigeration cycle on the basis of the time average of heating capacity containing performance degradation due to frost in the heating operation, such that supply of the heating capacity is stabilized as much as possible, thus preventing a significant reduction in room temperature.

In Embodiment 1, the condition for the determination by the controller 8 as to whether to start the defrosting operation is that the difference between the evaporating temperature and the temperature of air flowing into the outdoor heat exchanger 5 is greater than or equal to 15 degrees C. This value is set on the basis of a lower limit of the evaporating temperature at which a necessary heating capacity is obtained in the use at the lowest possible outside air temperature. If the set temperature is changed, an evaporating temperature decrement varies and defrosting time simultaneously varies due to a variation in amount of frost deposited. As regards another method of setting, therefore, the time averages of heating capacity associated with set values may be compared and a set temperature at which the average heating capacity is maximized may be selected. Furthermore, since the necessary heating capacity and the amount of frost deposited per unit time vary depending on outside air temperature, it is preferred to change the set value depending on outside air temperature.

Furthermore, since the intervals between the starts of the defrosting operation vary depending on outside air conditions, it may be difficult to allow each refrigeration cycle to perform the defrosting operation at regular intervals at any time. Preferably, therefore, while any one of the refrigeration cycles is performing the defrosting operation, the other refrigeration cycles are prevented from performing the defrosting operation. In addition, preferably, each of the refrigeration cycles is prevented from performing the defrosting operation for a predetermined period of time from a time at which any one of the refrigeration cycles returned to the heating operation from the defrosting operation. Such control allows up to one refrigeration cycle to perform, for example, the defrosting operation. The other refrigeration cycles can continue the heating operation.

As described above, in the refrigerating and air-conditioning system according to Embodiment 1, at least one of the multiple refrigeration cycles performs the defrosting operation, the other refrigeration cycles continue the heating operation, and the refrigeration cycles perform the defrosting operation, for example, sequentially in an alternate manner, so that air conditioning in the indoor space can be achieved by the entire apparatus while each outdoor heat exchanger 5 is being defrosted. In this case, stopping the outdoor fan 7 can reduce defrosting operation time. Consequently, efficient air conditioning can be achieved by the apparatus as a whole. In addition, since the indoor fan 6 corresponding to the refrigeration cycle which is performing the defrosting operation is stopped, cold air can be prevented from being blown into the indoor space. Since the refrigeration cycles can achieve efficient heating while the defrosting operation is being performed, a comfortable room temperature can be maintained at a low outside air temperature. Thus, the refrigerating and air-conditioning apparatus that offers high comfort can be provided.

Embodiment 2

Figure 4:
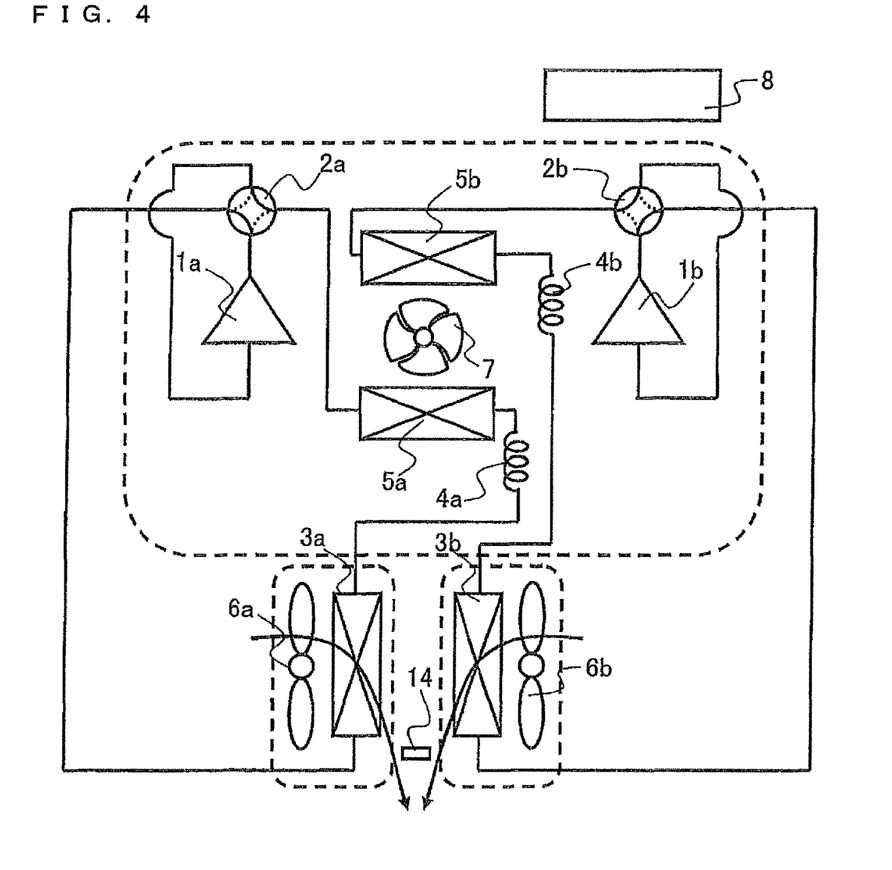
FIG. 4 is a diagram illustrating a configuration of a refrigerating and air-conditioning apparatus according to Embodiment 2 of the invention.

FIG. 4 is a diagram illustrating a configuration of a refrigerating and air-conditioning apparatus according to Embodiment 2 of the invention. In FIG. 4, for example, components designated by the same reference numerals as those in FIG. 1 perform, for example, the same operations as those described in Embodiment 1. It is assumed that in order to send air associated with air conditioning to an indoor space, the refrigerating and air-conditioning apparatus according to Embodiment 2 is disposed in a place where an air path or the like is provided so that air blown from the indoor fan 6a and air blown from the indoor fan 6b are mixed together and the resultant air is sent into the indoor space. A temperature sensor 14 is temperature detecting means for detecting a temperature of air associated with mixture. The temperature detected by the temperature sensor 14 is used to control, for example, a rotation speed of the indoor fan 6a or 6b by the controller 8.

As described above, the refrigerating and air-conditioning apparatus according to Embodiment 2 is disposed in a place where an air path or the like is provided such that flows of air blown from the indoor fans 6 are mixed together and the resultant air is then sent to the indoor space. For example, in the case where multiple refrigeration cycles perform the defrosting operation in the heating operation in a manner similar to the refrigerating and air-conditioning apparatus according to Embodiment 1, it is preferred that the refrigeration cycle performing the defrosting operation is prevented from blowing cold air. The refrigerating and air-conditioning apparatus according to Embodiment 2 is therefore configured to control the temperature of blown air.

Control of the temperature of blown air in the defrosting operation will be specifically described below. The controller 8 controls the rotation speed of the indoor fan 6 associated with the defrosting operation so that an outlet temperature (e.g., a room temperature) based on mixed air reaches, for example, a predetermined temperature. For example, when the temperature detected by the temperature sensor 14 is lower than the predetermined outlet temperature (first, second, fifth, and sixth predetermined temperatures), the rotation speed is reduced. When the detected temperature is higher than the predetermined outlet temperature, the rotation speed is increased. Such control allows the temperature of air sent to the indoor space to be maintained at the predetermined outlet temperature. Furthermore, driving the indoor fan 6 associated with the defrosting operation increases a condensing capacity for defrosting to reduce defrosting time, thus increasing comfort, for example.

Although the predetermined outlet temperature, serving as a control target, is the room temperature in the above description, preferably, the outlet temperature is set to be higher than or equal to 36 degrees C., a human body temperature, if the heating capacity can be maintained. Furthermore, in addition to the control of the rotation speed of the indoor fan 6, the controller 8 can control, for example, the capacity of the compressor 1 associated with the defrosting operation to control the outlet temperature. In this case, although the indoor fan 6 is driven during the defrosting operation, the amount of air flow is reduced (to approximately ½, for example). The compressor 1 has a fixed operation range in order to maintain its reliability and accordingly has a lower capacity limit. It is therefore necessary to reduce the amount of air flow through the indoor fan 6. If detailed capacity control, such as unload control, is impossible, the amount of air flow through the indoor fan 6 has to be reduced.

The control of the capacity of the compressor 1 will be specifically described. The controller 8 controls the capacity of the compressor 1 in the refrigeration cycle which is performing the defrosting operation on the basis of a temperature detected by the temperature sensor 14. For example, when the temperature detected by the temperature sensor 14 is lower than the predetermined outlet temperature, the capacity of the compressor 1 is reduced. When the detected temperature is higher than the predetermined outlet temperature, the capacity of the compressor 1 is increased. Such control allows the temperature of air sent to the indoor space to be maintained at the predetermined outlet temperature. Furthermore, driving the indoor fan 6 associated with the defrosting operation increases the condensing capacity for defrosting to reduce the defrosting time, thus improving the comfort, for example.

In Embodiment 2, since the heating operation is performed simultaneously with a cooling operation that serves as the defrosting operation, dehumidification can be performed while the outlet temperature is being maintained. In the refrigeration cycle performing the cooling operation, the indoor heat exchanger 3 cools air to achieve dehumidification. In the refrigeration cycle performing the heating operation, the indoor heat exchanger 3 reheats the air, so that the resultant air can be blown into the indoor space. Accordingly, reheating dehumidification can be easily performed in a summer day or the like at a relatively low outside air temperature, thus improving the comfort.

As described above, in the refrigerating and air-conditioning apparatus according to Embodiment 2, the controller 8 controls the rotation speed of the indoor fan 6 corresponding to the refrigeration cycle performing the defrosting operation on the basis of the temperature of air, obtained by mixing air flows blown from the indoor fans 6, detected by the temperature sensor 14. Consequently, the temperature of air sent to the indoor space can be maintained at a predetermined temperature while the defrosting operation is being performed. In addition, the controller 8 may control the capacity of the compressor 1 in the refrigeration cycle performing the defrosting operation, instead of or in addition to the control of the rotation speed of the indoor fan 6. Thus, the temperature of air sent to the indoor space can be similarly maintained at the predetermined temperature. Consequently, each refrigeration cycle can perform the defrosting operation while air conditioning in the indoor space is being continued without reduction of comfort. Additionally, since the mixed air can be sent to the indoor space, the indoor heat exchanger 3 in the refrigeration cycle associated with the defrosting operation is allowed to function as an evaporator, so that dehumidified air can be sent to the indoor space.

Embodiment 3

Figure 5:
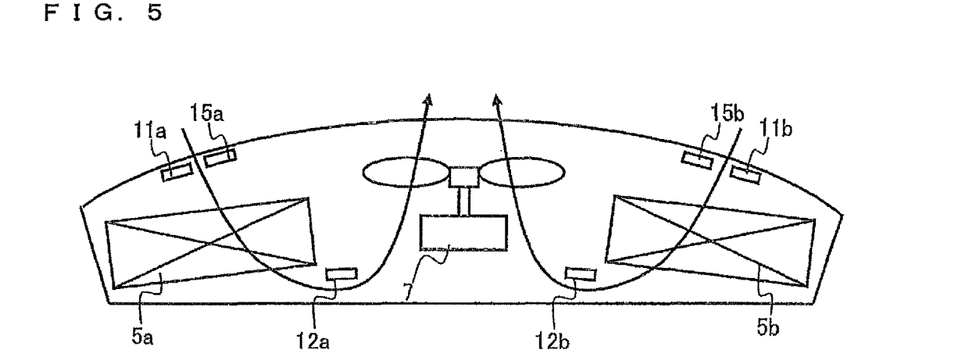
FIG. 5 is a schematic diagram explaining an outdoor side unit in Embodiment 3 of the invention.

FIG. 5 is a schematic diagram explaining an outdoor side unit according to Embodiment 3 of the invention. In FIG. 5, for example, components designated by the same reference numerals as those in, for example, FIG. 1 perform the same operations as those described in, for example, Embodiment 1. Air velocity sensors 15a and 15b are air velocity detecting means for detecting the velocity of air flowing into the outdoor heat exchangers 5a and 5b, respectively. The air velocities detected by the air velocity sensors 15a and 15b are used to control, for example, the rotation speed of the outdoor fan 7 by the controller 8.

For example, in the defrosting operation, the refrigerant discharged from the compressor 1 is allowed to pass through the outdoor heat exchanger 5, serving as a condenser, in order to perform defrosting using heat transferred from the refrigerant. In this case, if the outdoor heat exchanger 5 exchanges heat with, for example, low-temperature outside air, the amount of heat for defrosting would be lost, thus reducing the condensing temperature. Disadvantageously, it leads to inefficiency. The outdoor heat exchanger 5 may not be defrosted in some cases.

According to Embodiment 3, therefore, the velocities of flows of air, serving as outside air, into the outdoor heat exchangers 5 are detected by the air velocity sensors 15a and 15b. The controller 8 controls the rotation speed of the outdoor fan 7 such that the velocity of air flowing into and out of the outdoor heat exchanger 5 associated with the refrigeration cycle performing the defrosting operation reaches zero.

In cases where the refrigerating and air-conditioning apparatus according to Embodiment 3 is installed on a railroad vehicle or the like, the velocity of airflow of outside air depends on the traveling speed of the vehicle. Accordingly, the controller 8 may control the rotation speed of the outdoor fan 7 on the basis of the speed of the vehicle detected by a speed sensor (not illustrated) instead of the air velocity sensors 15a and 15b to prevent the outside air from flowing into the outdoor heat exchanger 5 of the refrigeration cycle performing the defrosting operation.

Although the controller 8 controls the rotation speed of the outdoor fan 7 on the basis of the air velocities associated with detection by the air velocity sensors 15 in the above description, for example, a saturation temperature calculated by the pressure sensors 13 for measuring the refrigerant pressures in the outdoor heat exchangers 5a and 5b may be used. The control of the rotation speed of the outdoor fan 7 based on the saturation temperature for control of the condensing temperature also improves comfort as in the above-described advantages.

For example, the controller 8 calculates the condensing temperature in the outdoor heat exchanger 5 in the defrosting operation on the basis of pressures detected by the pressure sensors 13 and controls the rotation speed of the outdoor fan 7 such that the condensing temperature reaches a predetermined temperature (third, fourth, and seventh predetermined temperatures, e.g., 10 degrees C.) or higher. When determining that the condensing temperature is low, the controller 8 reduces the rotation speed. When determining that the condensing temperature is high, the controller 8 increases the rotation speed. Such control enables a predetermined condensing temperature to be maintained. Furthermore, driving the outdoor fan 7 increases the heating capacity associated with the heating operation and minimizes a reduction in capacity in the defrosting operation, thus improving the comfort.

In the above description, the condensing temperature, serving as a control target value in Embodiment 3, is fixed at 10 degrees C. because frost can be melted at or above 0 degrees C. For example, when the target value is changed, defrosting time and the heating capacity also vary. In addition, therefore, the time averages of heating capacity relative to a change in target value may be compared and a maximum target value may be set. Furthermore, preferably, the target value is changed depending on outside air temperature because the necessary heating capacity and the amount of frost deposited per unit time vary depending on outside air temperature.

In the above description, the condensing temperature in the outdoor heat exchanger 5 associated with the defrosting operation is controlled by controlling the rotation speed of the outdoor fan 7. In addition, for example, the controller 8 can control the capacity of the compressor 1 associated with the defrosting operation to control the condensing temperature, thus achieving the same advantages. In this case, for example, the outdoor fan 7 is continuously driven in a manner similar to normal operation while the defrosting operation is being performed.

As regards control of the capacity of the compressor 1, the controller 8 can change the capacity of each of the compressors 1a and 1b. The controller 8 controls the capacity of the compressor 1a or 1b associated with the defrosting operation such that when determining that the condensing temperature is low, the controller 8 increases the capacity, and when determining that the condensing temperature is high, the controller 8 reduces the capacity. This control allows a predetermined condensing temperature to be maintained and further enables the outdoor fan 7 to be driven in a manner similar to normal operation. Advantageously, the heating capacity associated with the heating operation can be kept. Consequently, the defrosting time can be reduced, thus improving the comfort.

As described above, in the refrigerating and air-conditioning apparatus according to Embodiment 3, the rotation speed of the outdoor fan 7 is controlled on the basis of the air velocities detected by the air velocity sensors 15 such that air does not flow into and out of the outdoor heat exchanger 5 associated with the refrigeration cycle performing, for example, the defrosting operation. Accordingly, the amount of heat transferred from the refrigerant is not lost by the outside air and the condensing temperature is maintained at or above a predetermined temperature to prevent a reduction in condensing temperature. Advantageously, efficient defrosting can be achieved. In addition, since the reduction in defrosting time prevents a reduction in room temperature, the comfort can be improved. Furthermore, if the capacity of the compressor 1 associated with the refrigeration cycle performing, for example, the defrosting operation is controlled to allow the condensing temperature in the outdoor heat exchanger 5 to be at or above the predetermined temperature, the same advantages can be achieved.

Embodiment 4

Figure 6:
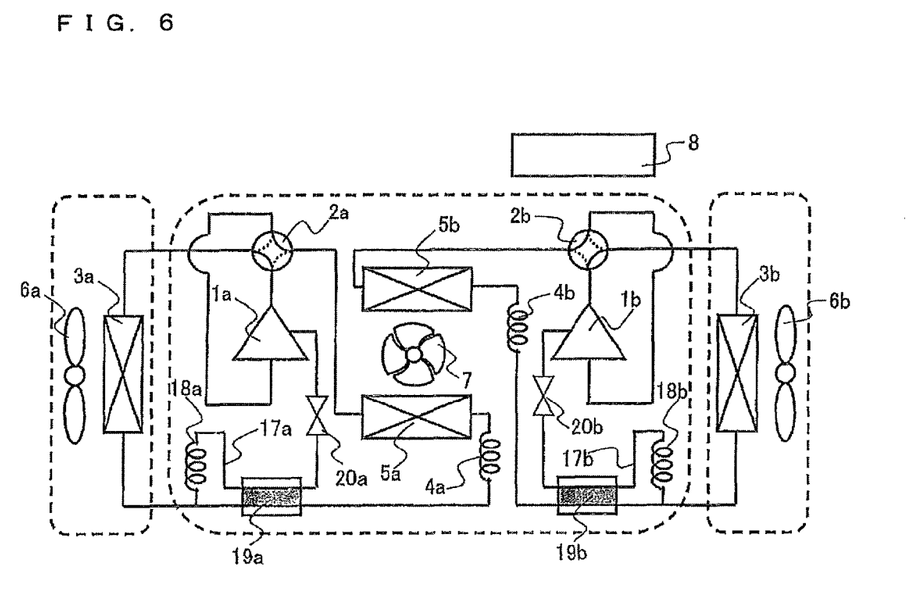
FIG. 6 is a diagram illustrating a configuration of a refrigerating and air-conditioning apparatus according to Embodiment 4 of the invention.

FIG. 6 is a diagram illustrating a configuration of a refrigerating and air-conditioning apparatus according to Embodiment 4 of the invention. In FIG. 6, for example, components designated by the same reference numerals as those in, for example, FIG. 1 perform the same operations as those described in, for example, Embodiment 1.

A bypass pipe 17 (17a, 17b) is connected at one end to a pipe which is disposed between the pressure reducing device 4 and the indoor heat exchanger 3 from which the refrigerant flows during heating and is connected at the other end to a compression chamber of the compressor 1. For example, the bypass pipe 17 is configured to divide the flow of refrigerant from the indoor heat exchanger 3 in, for example, the heating operation into two flows so as to inject (or introduce) the refrigerant into the compression chamber of the compressor 1 through an opening (not illustrated). Flow control means 18 (18a, 18b) is means for controlling the flow rate of the refrigerant passing through the bypass pipe 17. An internal heat exchanger 19 (19a, 19b) is a refrigerant-to-refrigerant heat exchanger configured to exchange heat between the refrigerant which has passed through the flow control means 18 and the refrigerant flowing to the pressure reducing device 4 in order to achieve subcooling. A solenoid valve 20 (20a, 20b) controls passage of the refrigerant through the bypass pipe 17 by opening and closing.

If injection is executed in the heating operation, the flow rate of refrigerant through the compressor 1 can be increased, thus increasing input for the compressor, namely, improving the heating capacity. Furthermore, although a low outside air temperature leads to a reduction in evaporating temperature and a high compression ratio, reliability is high because a discharge temperature can be suppressed. Furthermore, if the capacity of the compressor is variable, the capacity can be increased while the discharge temperature is suppressed. Accordingly, the heating capacity can be dramatically increased.

In Embodiment 4, if any of the refrigeration cycles is performing the defrosting operation, the controller 8 stops the outdoor fan 7. In this case, injection is executed in the refrigeration cycle associated with the heating operation. If the outdoor fan 7 is stopped and the evaporating temperature is accordingly reduced, the heating capacity can be kept. In addition, since a rise in discharge temperature can be suppressed, the defrosting operation according to Embodiment 4 can be achieved at a low outside air temperature. Thus, high reliability can be achieved.

Since injection is not performed in the defrosting operation or cooling operation, the solenoid valves 20a and 20b are arranged in the bypass pipes 17a and 17b, respectively, such that the solenoid valves 20a and 20b are closed in the defrosting operation or cooling operation.

As described above, in the refrigerating and air-conditioning apparatus according to Embodiment 4, the refrigerant can be injected into the compressor 1 in the heating operation. Advantageously, if the outdoor fan 7 is stopped for the defrosting operation in any of the refrigeration cycles under low outside air temperature conditions, the operation can be performed while the heating capacity is being kept. In addition, since a rise in temperature of the refrigerant discharged from the compressor 1 can be suppressed by injection, high reliability can be achieved.

Embodiment 5

Figure 7:
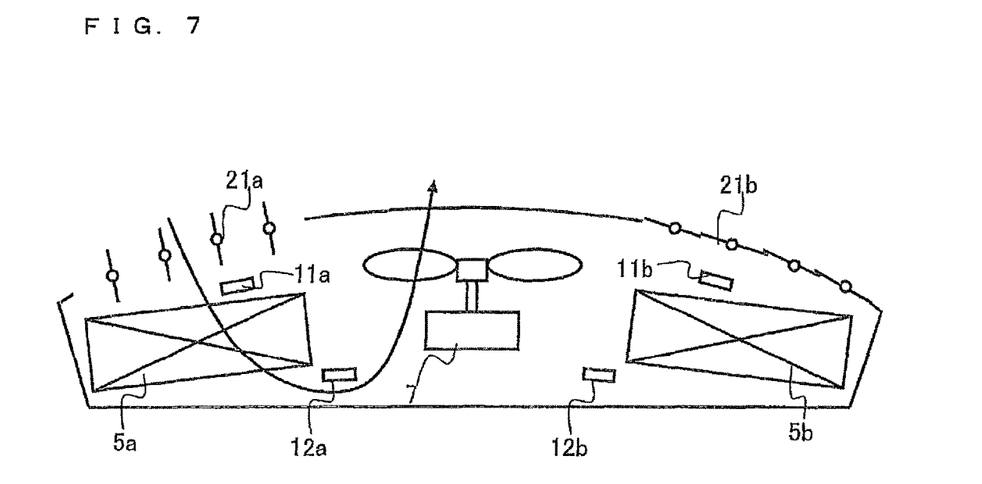
FIG. 7 is a schematic diagram explaining an outdoor side unit in Embodiment 5 of the invention.

FIG. 7 is a schematic diagram explaining an outdoor side unit according to Embodiment 5 of the invention. In FIG. 7, for example, components designated by the same reference numerals as those in, for example, FIG. 1 perform the same operations as those described in, for example, Embodiment 1. The refrigerating and air-conditioning apparatus according to Embodiment 5 includes dampers 21 (21a, 21b) in addition to the components in Embodiment 1. The dampers 21a and 21b are arranged on air inlet sides of the outdoor heat exchangers 5a and 5b, respectively, and are configured to control the flow of air into the outdoor heat exchangers 5a and 5b by opening and closing. In Embodiment 5, opening and closing are controlled to prevent the air from flowing into the outdoor heat exchanger 5 of the refrigeration cycle which is performing the dehumidifying operation.

For example, in cases where the refrigerating and air-conditioning apparatus is installed on a moving object, such as a vehicle, the flow of outside air may be generated. The damper 21 for the refrigeration cycle performing the defrosting operation is therefore closed, so that the flow of outside air into an indoor space through the outdoor heat exchanger 5 associated with the defrosting operation can be blocked, irrespective of movement of the vehicle or whether the outdoor fan 7 is driven. Consequently, the outdoor fan 7 can be driven in accordance with the refrigeration cycle associated with the heating operation, thus improving a heating capacity.

As described above, in the refrigerating and air-conditioning apparatus according to Embodiment 5, the dampers 21 are arranged and opening and closing of the dampers 21 are controlled, so that, for example, the amount of heat for defrosting can be prevented from being lost due to the outside air and a reduction in condensing temperature can also be prevented. Thus, efficient defrosting can be achieved. Consequently, defrosting time can be reduced and a reduction in room temperature can therefore be prevented, thus improving comfort.

INDUSTRIAL APPLICABILITY

Although not particularly limited, each of the refrigerating and air-conditioning apparatuses according to Embodiments 1 to 5 can be installed on, for example, a railroad vehicle and be used to perform air conditioning in the vehicle or the like. Although the use of two refrigeration cycles has been described in each of Embodiments 1 to 5, the number of refrigeration cycles is not limited to two. Three or more refrigeration cycles may be arranged. Furthermore, the controls performed by the controller 8 in Embodiments 1 to 4 may be performed in various combinations to achieve air conditioning control by the refrigerating and air-conditioning apparatus.

REFERENCE SIGNS LIST 1, 1a, 1b, compressor; 2, 2a, 2b, four-way valve; 3, 3a, 3b, outdoor heat exchanger; 4, 4a, 4b, pressure reducing device; 5, 5a, 5b, indoor heat exchanger; 6, 6a, 6b, indoor fan; 7, outdoor fan; 8, controller; 9, 9a, 9b, temperature sensor; 10, 10a, 10b, humidity sensor; 11, 11a, 11b, temperature sensor; 12, temperature sensor; 13, 13a, 13b, pressure sensor; 14, 14a, 14b, temperature sensor; 15, 15a, 15b, air velocity sensor; 17, 17a, 17b, bypass pipe; 18, 18a, 18b, flow control means; 19, 19a, 19b, internal heat exchanger; 20, 20a, 20b, solenoid valve; and 21, 21a, 21b, damper.

The invention claimed is:

1. A refrigerating and air-conditioning apparatus comprising:
multiple refrigeration cycles each including a compressor, a four-way valve, an indoor heat exchanger, a pressure reducing device, and an outdoor heat exchanger which are connected by a pipe, each refrigeration cycle being configured to be capable of performing a cooling operation and a heating operation;
an outdoor fan configured to send air for heat exchange with the outdoor heat exchangers of the refrigeration cycles;
multiple indoor fans arranged corresponding to the respective indoor heat exchangers of the refrigeration cycles, each indoor fan being configured to create air flow to be sent through the respective indoor heat exchanger to an air-conditioning target space; and
a controller configured to determine whether at least one of the refrigeration cycles is performing a defrosting operation, determine an indoor-fan air-temperature of the indoor fans, variably control, in response to the indoor-fan air-temperature, a capacity of the compressor of the at least one refrigeration cycle performing the defrosting operation which defrosts the outdoor heat exchanger corresponding to the at least one refrigeration cycle performing the defrost operation such that the indoor-fan air-temperature of air mixed by air-sending through the indoor fans reaches and substantially maintains a first predetermined temperature.

2. The refrigerating and air-conditioning apparatus of claim 1, wherein the controller stops an indoor fan of the indoor fans, the indoor fan corresponding to the at least one refrigeration cycle performing the defrosting operation.

3. The refrigerating and air-conditioning apparatus of claim 1, wherein when the at least one of the refrigeration cycles starts the defrosting operation, the controller stops the outdoor fan.

4. The refrigerating and air-conditioning apparatus of claim 1, further comprising:
air velocity detecting unit for detecting a velocity of airflow of outside air,
wherein when the at least one of the refrigeration cycles starts the defrosting operation, the controller variably controls, in response to the indoor-fan air-temperature, a rotation speed of the outdoor fan depending on the velocity of airflow associated with detection by the air velocity detecting unit.

5. The refrigerating and air-conditioning apparatus of claim 1, wherein when the at least one of the refrigeration cycles starts the defrosting operation for defrosting using the outdoor heat exchanger of the at least one of the refrigeration cycles as a condenser, the controller variably controls, in response to the indoor-fan air-temperature, a rotation speed of the outdoor fan such that a refrigerant condensing temperature in the outdoor heat exchanger of the at least one refrigeration cycle performing the defrosting operation reaches and substantially maintains a second predetermined temperature or higher.

6. The refrigerating and air-conditioning apparatus of claim 1,
wherein at least one of the refrigeration cycles includes
a bypass pipe configured to allow part of a refrigerant flowing between the indoor heat exchanger and the pressure reducing device of the at least one of the refrigeration cycles to flow into a compression chamber included in the compressor,
flow control unit for controlling a rate of the refrigerant flowing through the bypass pipe, and
an internal heat exchanger configured to exchange heat between the refrigerant flowing between the indoor heat exchanger and the pressure reducing device of the at least one of the refrigeration cycles and the refrigerant flowing through the bypass pipe, and
wherein while the refrigeration cycle including the bypass pipe is performing the heating operation, the controller controls the flow control unit.

7. The refrigerating and air-conditioning apparatus of claim 1, further comprising:
dampers each configured to control flow of air into the corresponding outdoor heat exchanger of the outdoor heat exchangers by opening and closing,
wherein the controller selectively controls a first damper of the dampers, the first damper corresponding to the outdoor heat exchanger subjected to the defrosting operation of the dampers such that the damper closes.

8. The refrigerating and air-conditioning apparatus of claim 1, wherein the controller changes the at least one refrigeration cycle performing the defrosting operation to another refrigeration cycle so as to prevent the refrigeration cycle from continuously performing the defrosting operation.

9. The refrigerating and air-conditioning apparatus of claim 1, wherein the controller prevents a next defrosting operation in another one of the refrigeration cycles from being started for a predetermined period of time from a time at which the at least one refrigeration cycle performing the defrosting operation terminated the defrosting operation and started the heating operation.

10. The refrigerating and air-conditioning apparatus of claim 1, wherein the controller allows the refrigeration cycle which has terminated the heating operation to perform the defrosting operation.

11. The refrigerating and air-conditioning apparatus of claim 1, wherein the controller variably controls the capacity of the compressor of the at least one refrigeration cycle performing the defrosting operation in proportion to the indoor-fan air-temperature.

12. A refrigerating and air-conditioning apparatus comprising:
multiple refrigeration cycles each including a compressor, a four-way valve, an indoor heat exchanger, a pressure reducing device, and an outdoor heat exchanger which are connected by a pipe, each refrigeration cycle being configured to be capable of performing a cooling operation and a heating operation;
an outdoor fan configured to send air for heat exchange with the outdoor heat exchangers of the refrigeration cycles;
multiple indoor fans arranged corresponding to the respective indoor heat exchangers of the refrigeration cycles, each indoor fan being configured to create air flow to be sent through the respective indoor heat exchanger to an air-conditioning target space; and
a controller configured to determine whether at least one of the refrigeration cycles is performing a defrosting operation, determine an indoor-fan air-temperature of the indoor fans, variably control, in response to the indoor-fan air-temperature, a rotation speed of the indoor fan corresponding to the at least one refrigeration cycle performing the defrosting operation which defrosts the outdoor heat exchanger corresponding to the at least one refrigeration cycle performing the defrost operation such that the indoor-fan air-temperature of air mixed by air-sending through the indoor fans reaches and substantially maintains a first predetermined temperature.

13. The refrigerating and air-conditioning apparatus of claim 12, wherein the controller variably controls the rotation speed of the indoor fan of the at least one refrigeration cycle performing the defrosting operation in proportion to the indoor-fan air-temperature.

14. A refrigerating and air-conditioning apparatus comprising:
multiple refrigeration cycles each including a compressor, a four-way valve, an indoor heat exchanger, a pressure reducing device, and an outdoor heat exchanger which are connected by a pipe, each refrigeration cycle being configured to be capable of performing a cooling operation and a heating operation;
an outdoor fan configured to send air for heat exchange with the outdoor heat exchangers of the refrigeration cycles;
multiple indoor fans arranged corresponding to the respective indoor heat exchangers of the refrigeration cycles, each indoor fan being configured to create air flow to be sent through the respective indoor heat exchanger to an air-conditioning target space; and
a controller configured to determine whether at least one of the refrigeration cycles is performing a defrosting operation, determine an indoor-fan air-temperature of the indoor fans, variably control, in response to the indoor-fan air-temperature, a capacity of the compressor of the at least one refrigeration cycle performing the defrosting operation which defrosts the outdoor heat exchanger corresponding to the at least one refrigeration cycle performing the defrost operation such that a refrigerant condensing temperature in the outdoor heat exchanger of the at least one refrigeration cycle performing the defrosting operation reaches and substantially maintains a first predetermined temperature or higher.

15. The refrigerating and air-conditioning apparatus of claim 14, wherein the controller variably controls a rotation speed of the indoor fan corresponding to the at least one refrigeration cycle performing the defrosting operation such that the indoor-fan air-temperature of air mixed by air-sending through the indoor fans reaches and substantially maintains a second predetermined temperature.

16. The refrigerating and air-conditioning apparatus of claim 14, wherein the controller variably controls the capacity of the compressor of the at least one refrigeration cycle performing the defrosting operation in proportion to the indoor-fan air-temperature.

17. A refrigerating and air-conditioning apparatus comprising:

multiple refrigeration cycles each including a compressor, a four-way valve, an indoor heat exchanger, a pressure reducing device, and an outdoor heat exchanger which are connected by a pipe, each refrigeration cycle being configured to be capable of performing a cooling operation and a heating operation;

an outdoor fan configured to send air for heat exchange with the outdoor heat exchangers of the refrigeration cycles;

multiple indoor fans arranged corresponding to the respective indoor heat exchangers of the refrigeration cycles, each indoor fan being configured to create air flow to be sent through the respective indoor heat exchanger to an air-conditioning target space; and a controller configured to determine whether at least one of the refrigeration cycles is performing a defrosting operation, determine an indoor-fan air-temperature, variably control, in response to the indoor-fan air-temperature, a rotation speed of the outdoor fan of the at least one refrigeration cycle performing the defrosting operation which defrosts the outdoor heat exchanger corresponding to the at least one refrigeration cycle performing the defrost operation such that a refrigerant condensing temperature in the outdoor heat exchanger of the at least one refrigeration cycle performing the defrosting operation reaches and substantially maintains a first predetermined temperature or higher.

18. The refrigerating and air-conditioning apparatus of claim 17, wherein the controller variably controls a capacity of the compressor of the at least one refrigeration cycle performing the defrosting operation such that an indoor-fan air-temperature of air mixed by air-sending through the indoor fans reaches and substantially maintains a second predetermined temperature.

19. The refrigerating and air-conditioning apparatus of claim 17, wherein the controller variably controls the rotation speed of the outdoor fan of the at least one refrigeration cycle performing the defrosting operation in proportion to the indoor-fan air-temperature.

* * * * *